(12) United States Patent
Huang (10) Patent No.: US 10,189,686 B2
(45) Date of Patent: Jan. 29, 2019

(54) PNEUMATIC AND MANUAL CLUTCH OF POWER WINCH

(71) Applicant: Comeup Industries Inc., Taipei (TW)

(72) Inventor: Shih Jyi Huang, Taipei (TW)

(73) Assignee: Comeup Industries Inc., Taipei (TW)

( * ) Notice: Subject to any disclaimer, the term of this patent is extended or adjusted under 35 U.S.C. 154(b) by 115 days.

(21) Appl. No.: 15/409,647

(22) Filed: Jan. 19, 2017

(65) Prior Publication Data

US 2018/0201486 A1    Jul. 19, 2018

(51) Int. Cl.
| | | |
|---|---|---|
| *B66D 1/02* | (2006.01) |
| *B66D 1/22* | (2006.01) |
| *B66D 1/12* | (2006.01) |
| *B66D 3/26* | (2006.01) |
| *B66D 1/44* | (2006.01) |
| *F16D 25/00* | (2006.01) |
| *F16D 23/12* | (2006.01) |
| *F16D 121/02* | (2012.01) |
| *F16D 121/14* | (2012.01) |

(52) U.S. Cl.
CPC ............... *B66D 1/02* (2013.01); *B66D 1/12* (2013.01); *B66D 1/22* (2013.01); *B66D 1/44* (2013.01); *B66D 3/26* (2013.01); *F16D 23/12* (2013.01); *F16D 25/00* (2013.01); *B66D 2700/0125* (2013.01); *B66D 2700/0183* (2013.01); *F16D 2121/02* (2013.01); *F16D 2121/14* (2013.01)

(58) Field of Classification Search
CPC ... B66D 1/02; B66D 1/12; B66D 1/14; B66D 1/16; B66D 1/22; B66D 1/44; B66D 3/16; B66D 2700/0125; B66D 2700/0183; F16D 23/12; F16D 25/00; F16D 2121/02; F16D 2121/14
See application file for complete search history.

(56) References Cited

U.S. PATENT DOCUMENTS

| | | | |
|---|---|---|---|
| 7,891,641 B1 * | 2/2011 | Miller ................ | B66D 1/16 254/344 |
| 9,051,160 B2 * | 6/2015 | Zheng ................ | B66D 1/14 |
| 9,908,752 B2 * | 3/2018 | Huang ................ | B66D 1/12 |
| 2017/0320709 A1 * | 11/2017 | Frazier ................ | B66D 1/22 |
| 2018/0118533 A1 * | 5/2018 | Karambelas ........ | B66D 1/48 |

* cited by examiner

*Primary Examiner* — Michael E Gallion
(74) *Attorney, Agent, or Firm* — Alan D. Kamrath; Kamrath IP Lawfirm, P.A.

(57) ABSTRACT

A pneumatic and manual clutch of a power winch provides an option of controlling the clutch by a manual or pneumatic method. The pneumatic control method just needs to connect a pump connector of an air pump to a pneumatic connector of the clutch properly to start or stop the air pump even when a user is standing at a position far from the power winch and the clutch can be turned on and off by starting or stopping the air pump. Either a cable or wireless remote control can be used to start or stop the air pump, to provide a very convenient operation.

1 Claim, 11 Drawing Sheets

PNEUMATIC AND MANUAL CLUTCH OF POWER WINCH

BACKGROUND OF THE INVENTION

Field of the Invention

The present invention relates to a clutch of a power winch and, more particularly, to a pneumatic and manual clutch of a power winch concurrently having the function of turning on or off the clutch pneumatically or manually.

Description of the Related Art

In general, power winches are designed for hanging or towing loads, and a common one is "a hoisting machine" which is a power winch used to provide vertical elevation of goods for high-rise buildings. In addition, a cable winder installed to the front of a jeep or an off-road vehicle for towing another car (for rescuing others) or escaping from dangerous environments (for rescuing oneself) is also a power winch. In the principle of operating the power winch, a power source (such as a power motor) is provided for outputting forward or reverse transmission power, and a deceleration mechanism is operated to drive a cable pulley to rotate in a forward or reverse direction to release or wind the cable. A hook at the front end of the cable is provided for hooking, hanging, and moving a load (such as a heavy object, another car, another object, etc).

Figure 1:
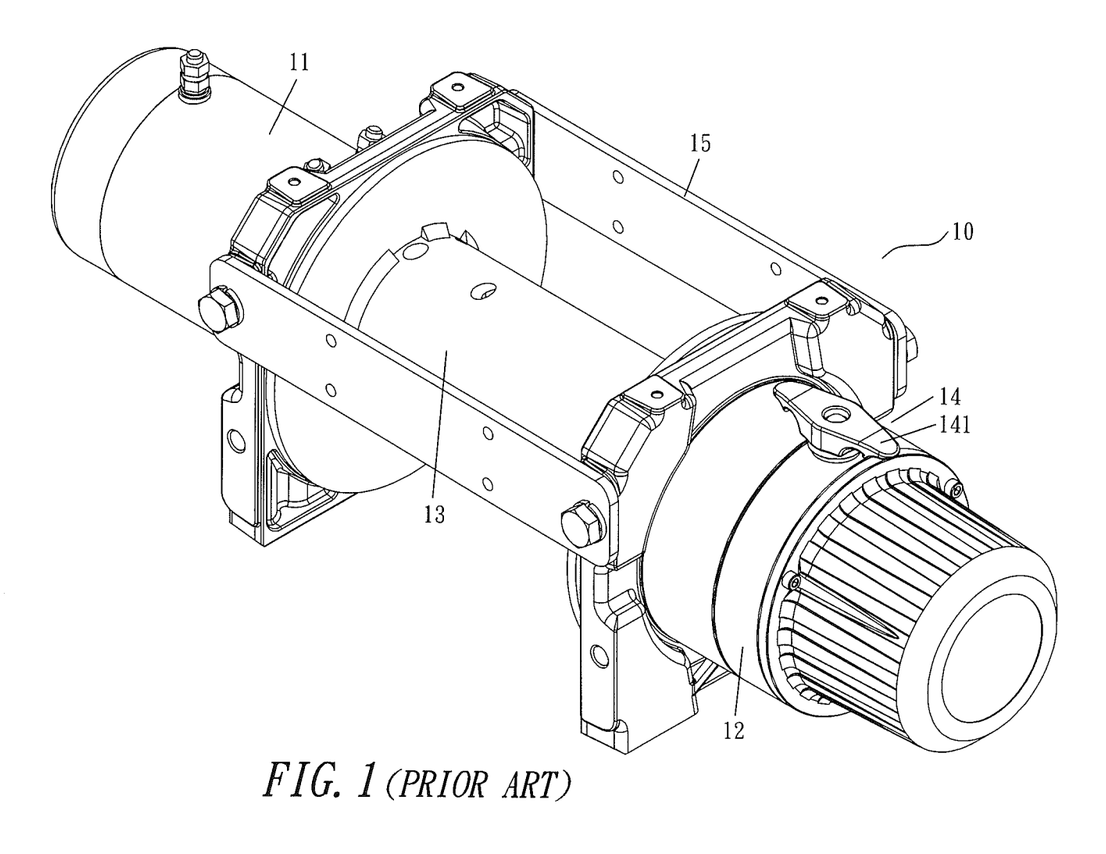
FIG. 1 is a perspective view of a conventional power winch.
Figure 2:
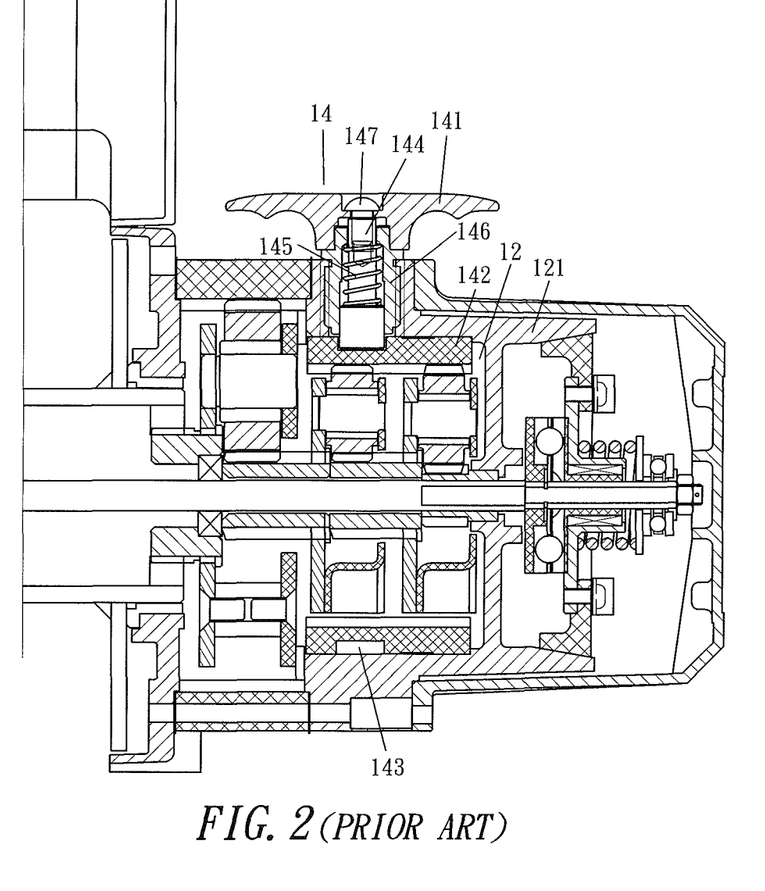
FIG. 2 is a cross-sectional view of a clutch and a deceleration device of a conventional power winch.

There are different types of conventional power winches, and a conventional power winch 10 as shown in FIGS. 1 and 2 has a motor 11 installed on a side of the power winch 10. The power of the motor 11 drives a deceleration device 12 installed on the other side of the conventional power winch 10 to operate through an internal axial transmission. The deceleration device 12 drives a cable pulley 13 to rotate after the transmission operation of a plurality of planetary gear sets, so that a cable (not shown in the figure) is wound around a cable (not shown in the figure) on the cable pulley 13 and provided for releasing or winding the cable. The deceleration device 12 installed on a side of the cable pulley 13 has a clutch 14, and a handle 141 extended upwardly from the clutch 14 and the handle 141 may be operated manually to descend or ascend, to connect or disconnect the transmission between the cable pulley 13 and the deceleration device 12. The cable pulley 13 is supported by a fixed seat 15, so that the power winch 10 can be operated stably and smoothly without errors.

Figure 3:
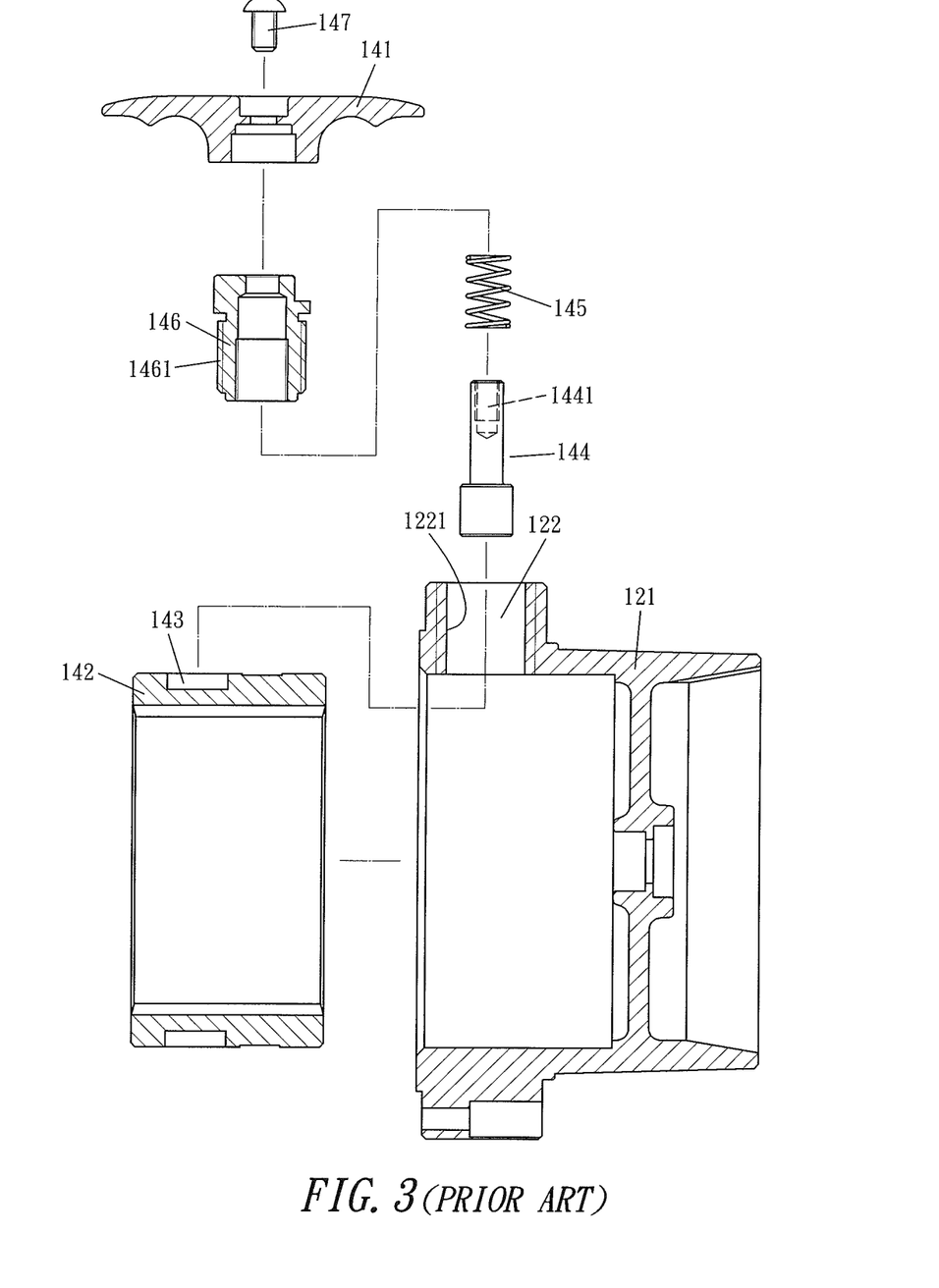
FIG. 3 is a cross-sectional exploded view of a clutch of a conventional power winch.
Figure 4:
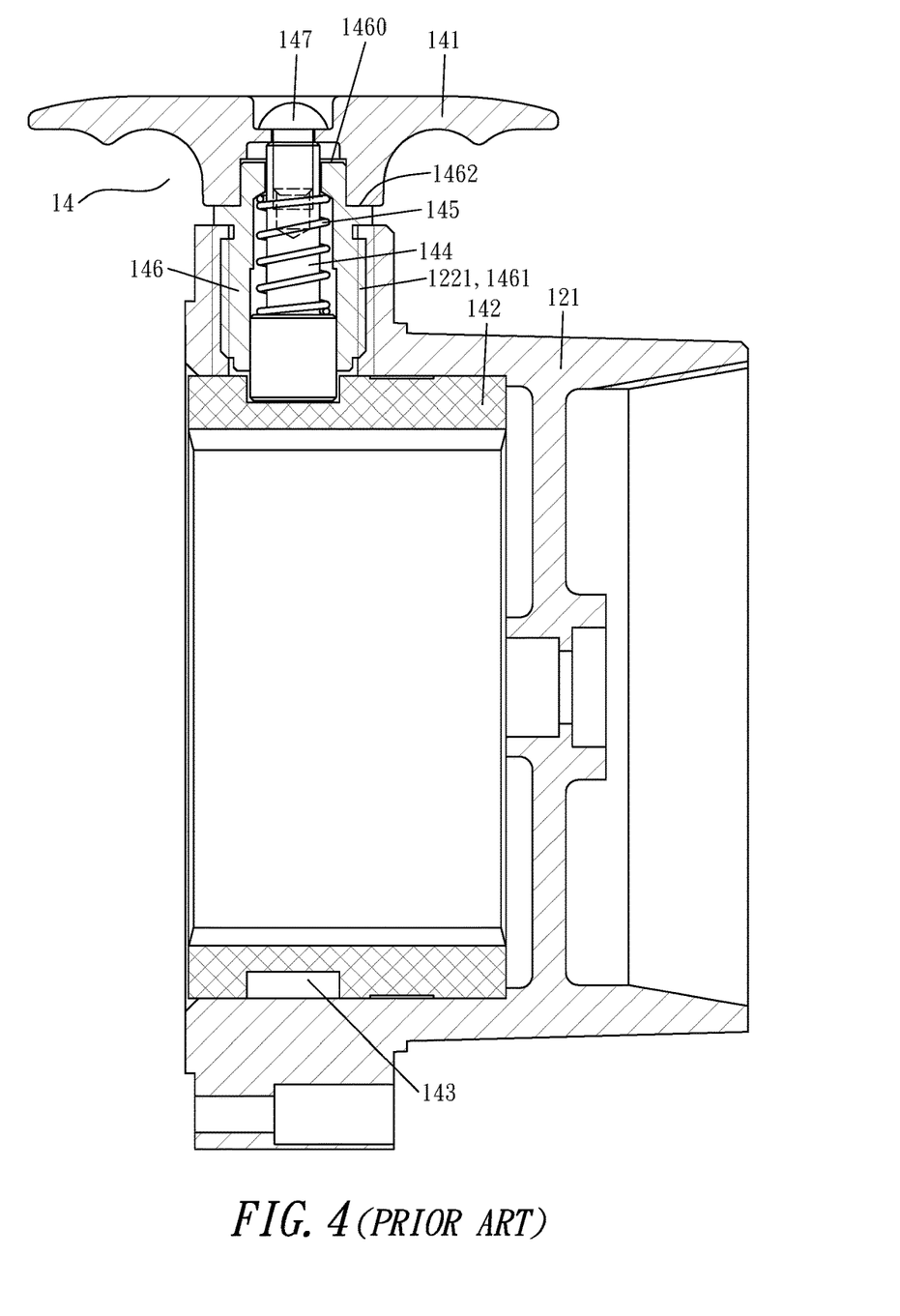
FIG. 4 is a cross-sectional view of a clutch and a portion of a deceleration device of a conventional power winch.
Figure 5:
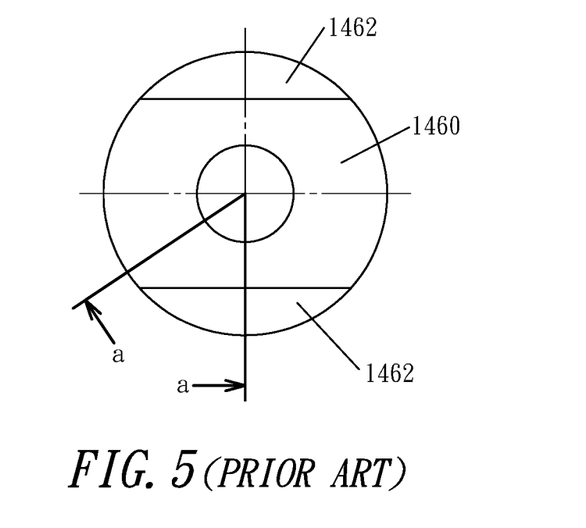
FIG. 5 is a partial top view of a sleeve of a conventional power winch.
Figure 6:
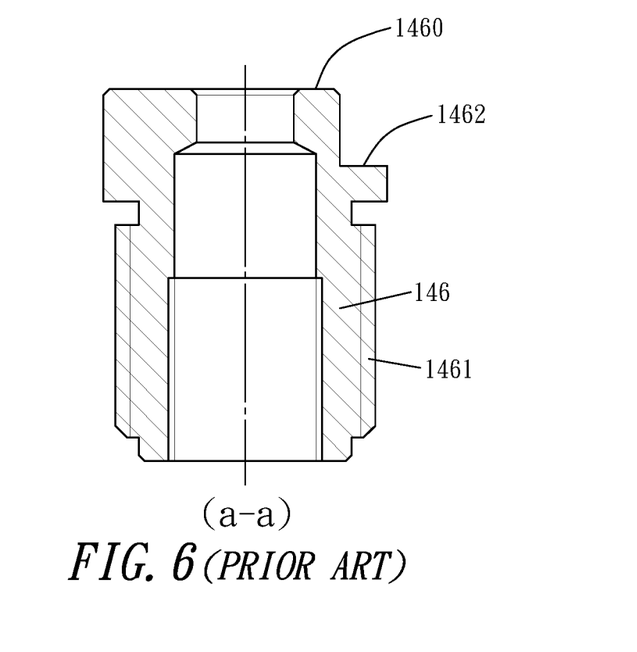
FIG. 6 is a cross-sectional view of Section a-a of FIG. 5.

With reference to FIGS. 3 and 4, the clutch 14 has an inner ring gear 142 sheathed on an inner side of the gearbox 121 of the deceleration device 12 and linked with the deceleration device 12, and an outer ring surface of the inner ring gear 142 has a plurality of braking grooves 143. The top of the gearbox 121 has a through slot 122 corresponsive to the braking groove 143, and an inner side of the through slot 122 has an internal thread 1221 (as shown in FIG. 3). A clutch lever 144 having an upwardly facing end and an inner thread slot 1441 is formed in the through slot 122, and the bottom end of the clutch lever 144 is embedded into one of the braking grooves 143 for stopping the rotation of the inner ring gear 142. An elastic member 145 is sheathed on the clutch lever 144, and a sleeve 146 having an external thread 1461 is screwed and coupled to the internal thread 1221 of the through slot 122. An engaging member 147 is installed to the handle 141 at the top of the sleeve 146 and capable of coupling and fixing the handle 141 and the clutch lever 144. As shown in FIGS. 5 and 6, the center of the top side of the sleeve 146 is higher than the opposite lateral sides of the sleeve 146, with high and low level surfaces 1460, 1462 formed to define a height difference.

Figure 7:
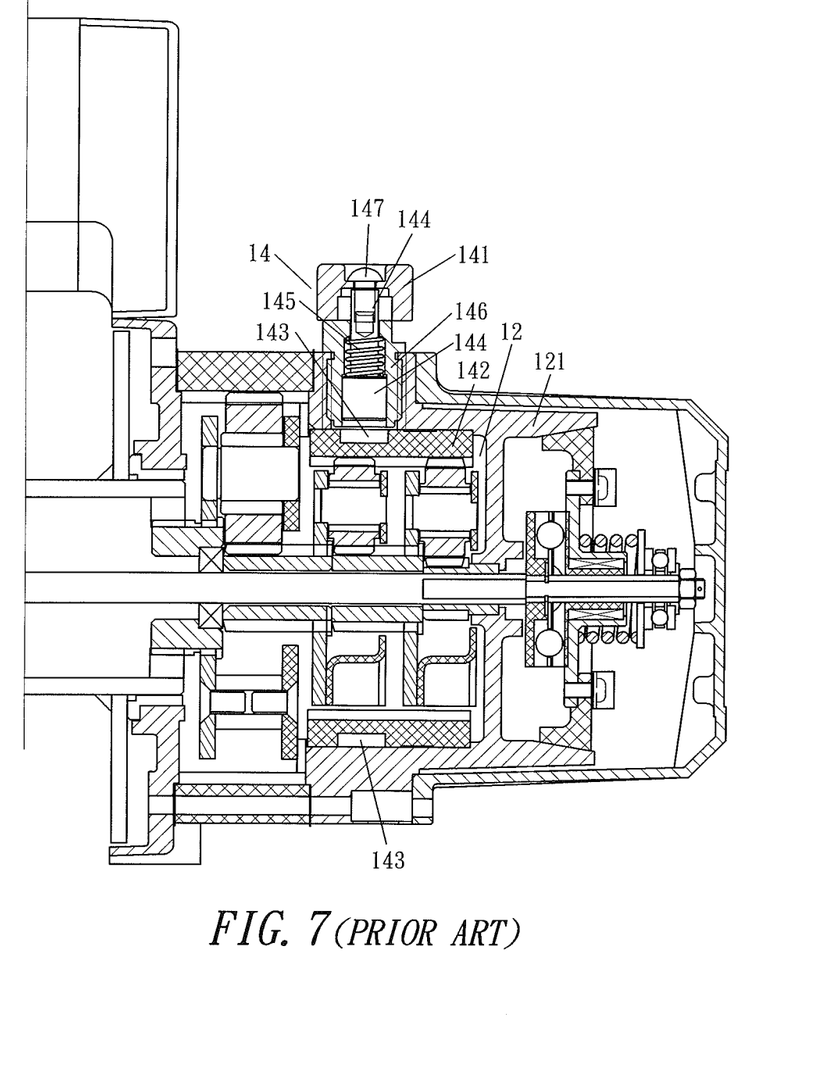
FIG. 7 is a schematic view of turning off a clutch of a conventional power winch.

With reference to FIG. 4 for the clutch assembly formed by the aforementioned components, and to FIG. 7 for the use of the clutch assembly, the handle 141 is lifted to a position higher than the high level surface 1460 of the sleeve 146 and is rotated to an angle substantially equal to 90°. Thus, when the bottom edge of the handle 141 abuts the high level surface 1460 of the sleeve 146, the bottom of the clutch lever 144 driven by the handle 141 to rise is released from the latch of the braking groove 143, so that the inner ring gear 142 can be rotated freely, and so that the operation of the deceleration device 12 can be stopped and no longer links or reaches the position of the cable pulley 13. As a result, an operator can pull out the cable easily to hook, hang and tow objects. On the other hand, when the handle 141 resumes its descending, the bottom of the clutch lever 144 enters into any one of the braking grooves 143 again, so that when the inner ring gear 142 stops its rotation, the status as shown in FIG. 2 will be resumed. Now, the power of the deceleration device 12 can be transmitted to the cable pulley 13 and provided for pulling back the cable, to achieve the effect of towing objects by the cable.

The clutch 14 of the aforementioned conventional power winch 10 is a pure manual operating assembly, and the operator has to get close to the power winch 10 to operate the handle 141 of the clutch 14 before the operator can ascend or descend the handle 141. Obviously, such application is inconvenient. Most conventional power winches are installed in the front bumper of a motor vehicle or to the top or to a hopper of the motor vehicle, which are positions not easily reachable by the operator's hands. The clutch 14 installed to the conventional power winch 10 is not totally useless, but there is a limitation requiring the operator to be near the power winch 10 before the operator can operate the clutch. Obviously, such clutch requires improvements.

SUMMARY OF THE INVENTION

In view of the aforementioned drawbacks of the prior art, the clutch was developed in accordance with the present invention to overcome the drawbacks of the prior art.

Therefore, it is a primary objective of the present invention to provide a power winch with a conveniently operated clutch.

Another objective of the present invention is to provide a double-clutch power winch that can be clutched pneumatically and manually.

To achieve the aforementioned objectives, the present invention provides a pneumatic and manual clutch of a power winch, with the power winch having a motor with a power for driving a deceleration device through an internal axial transmission, and a plurality of planetary gear sets for driving a cable pulley to rotate after the transmission. A cable wound around the cable pulley can be released or wound. The deceleration device has a gearbox, an inner ring gear sheathed on an inner side of the gearbox and linked with the deceleration device, with an outer ring surface of the inner ring gear having a plurality of braking grooves, with the top of the gearbox having a through slot corresponsive to the braking groove, and a clutch being installed on the through slot. The clutch has a clutch lever, with the bottom of the clutch lever being passed through the through slot and configured to be corresponsive to one of the braking grooves, and with the clutch lever being upwardly coupled to a handle. The handle is operated to ascend or descent to link the bottom of the clutch lever to be latched to or released from one of the braking grooves, to connect or disconnect the transmission between the deceleration device and the cable pulley. Air is pumped into the clutch, and the bottom of the clutch lever is lifted pneumatically to release from the latch with one of the braking grooves, to disconnect the transmission between the deceleration device and the cable pulley.

In the pneumatic and manual clutch of a power winch, the clutch has a lower seat, a clutch lever, an upper seat and a handle, with the bottom section of the lower seat coupled to the through slot of the gearbox. A penetrating slot is formed longitudinally inside the lower seat, and a positioning wall is formed and extended from the upper section. A ring groove is formed thereabove, and an O-ring is provided for enclosing the ring groove. The clutch lever is inserted into the penetrating slot of the lower seat, and a ring groove is formed at a lower section of the clutch lever. An O-ring is provided for enclosing the ring groove and for closely attaching to the inner wall of the penetrating slot. A large disc section is formed after the clutch lever is extended upwardly, and a ring groove is formed around the periphery of the large disc section. An O-ring is provided for enclosing the ring groove and is further extended upward to reduce the diameter. A micro-channel is formed at the peripheral wall at the top section, and an O-ring is provided for enclosing the micro-channel. Finally, a screw groove is inwardly and downwardly formed at the top end, and an elastic member is sheathed on the periphery of the clutch lever. The bottom end of the elastic member abuts the top of the large disc section. The bottom of the upper seat is hollowed inwardly, and the bottom end and the lower seat are coupled to the positioning wall. An O-ring of the lower seat is provided for defining a close attachment. When the upper seat is extended upwardly, the upper seat is aligned with the large disc section of the clutch lever, and the O-ring sheathed on the periphery of the large disc section defines a close attachment. A lower air chamber is formed between the bottom of the large disc section, the lower seat, the clutch lever and the upper seat, and an air inlet passage is formed on a peripheral wall of the upper seat corresponsive to the lower air chamber and extended to the outside for locking and coupling a pneumatic connector. A penetrating slot is inwardly formed on the top of the upper seat extended upwardly for extending the top end of the clutch lever to the outside, and the peripheral wall of the penetrating slot of the upper seat abuts the O-ring on the peripheral wall at the top section of the clutch lever to define a close attachment. The top end of the elastic member abuts the top wall inside the upper seat, and an upper air chamber is formed between the upper seat and the clutch lever and the large disc section. An air passage is formed on the peripheral wall, so that the upper air chamber is communicated to the outside. A silencer is locked and coupled to an outer side of the air passage, and a net is coupled to the front end of the silencer. The handle has a through groove inwardly formed at the top of the handle, and the bottom covers the upper seat. An engaging member is passed from top to bottom through the through groove and locked and coupled to the screw groove of the clutch lever.

DETAILED DESCRIPTION OF THE PREFERRED EMBODIMENTS

The technical characteristics, contents, advantages and effects of the present invention will be apparent with the detailed description of preferred embodiments accompanied with related drawings as follows.

Figure 8:
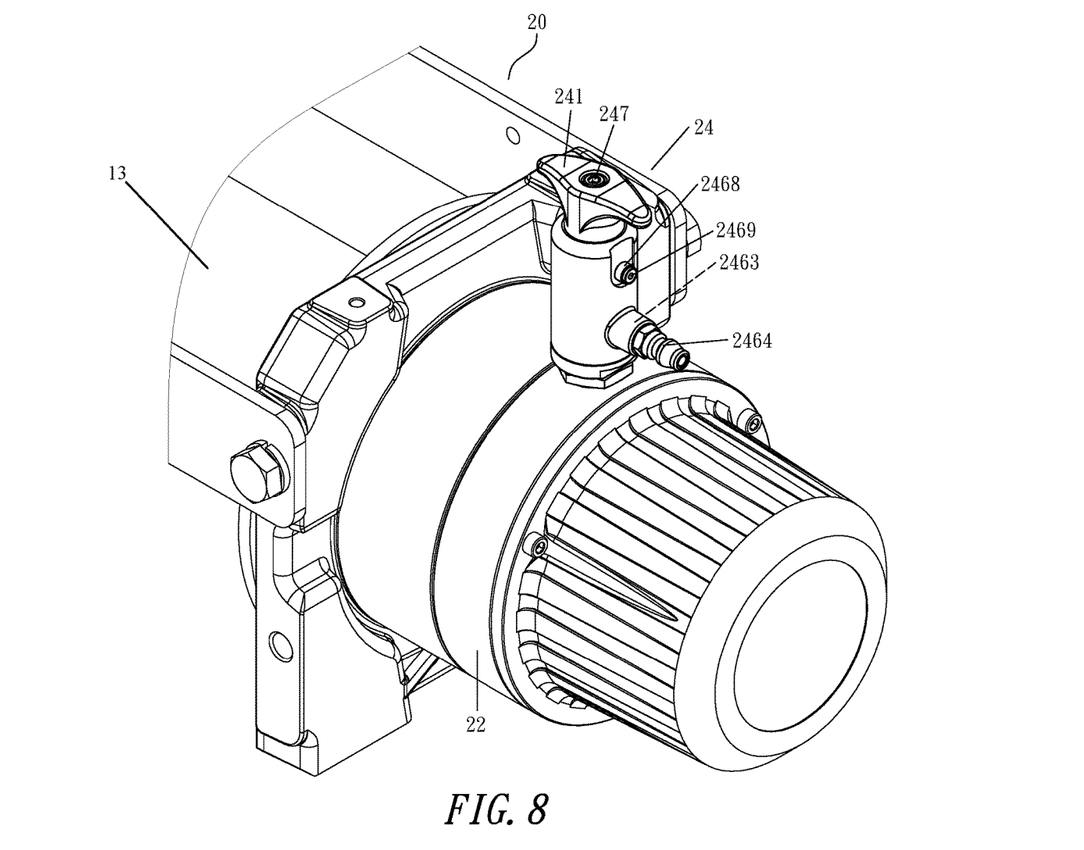
FIG. 8 is a partial perspective view of a preferred embodiment of the present invention.
Figure 9:
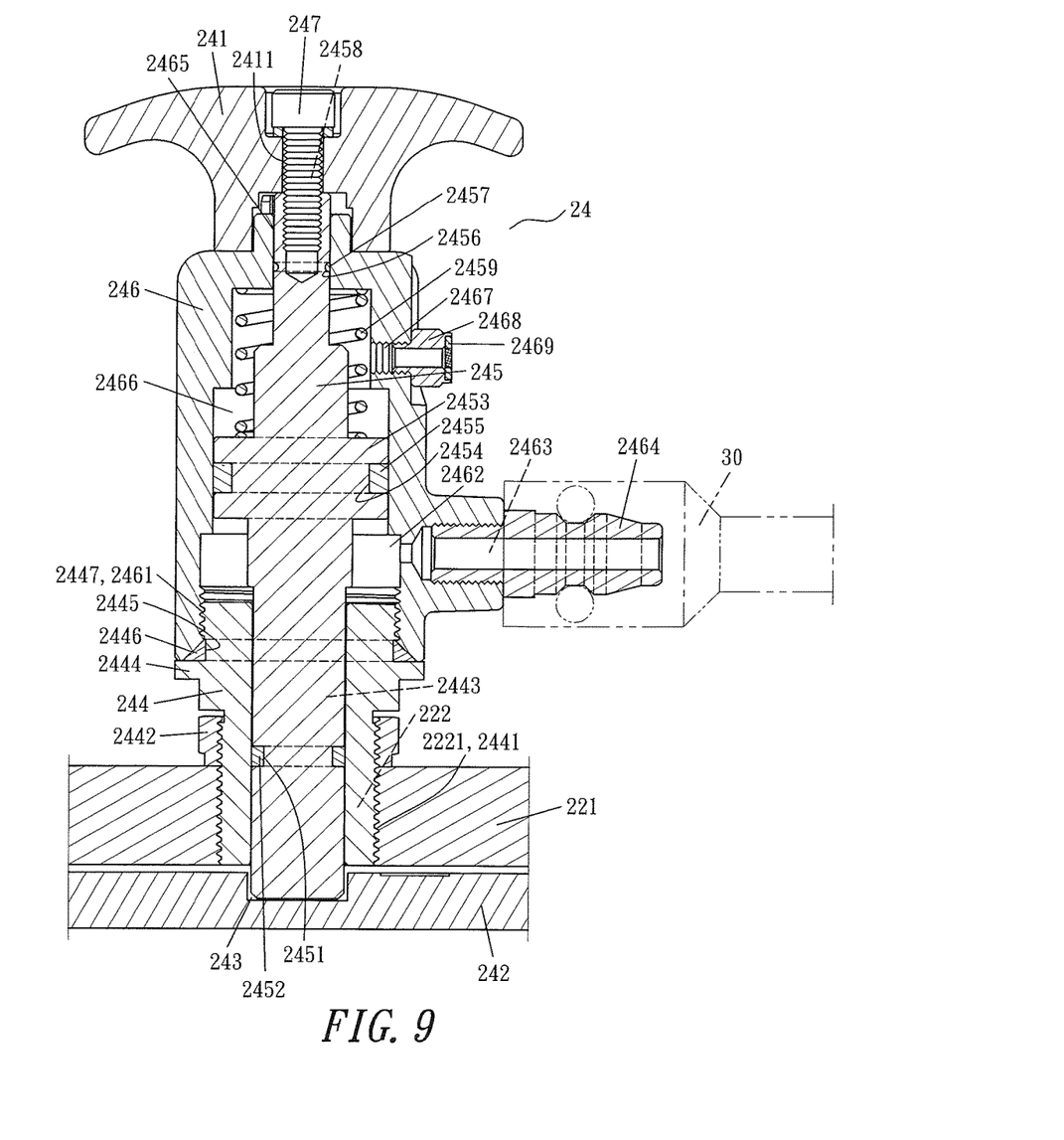
FIG. 9 is a cross-sectional view of a preferred embodiment of the present invention.
Figure 10:
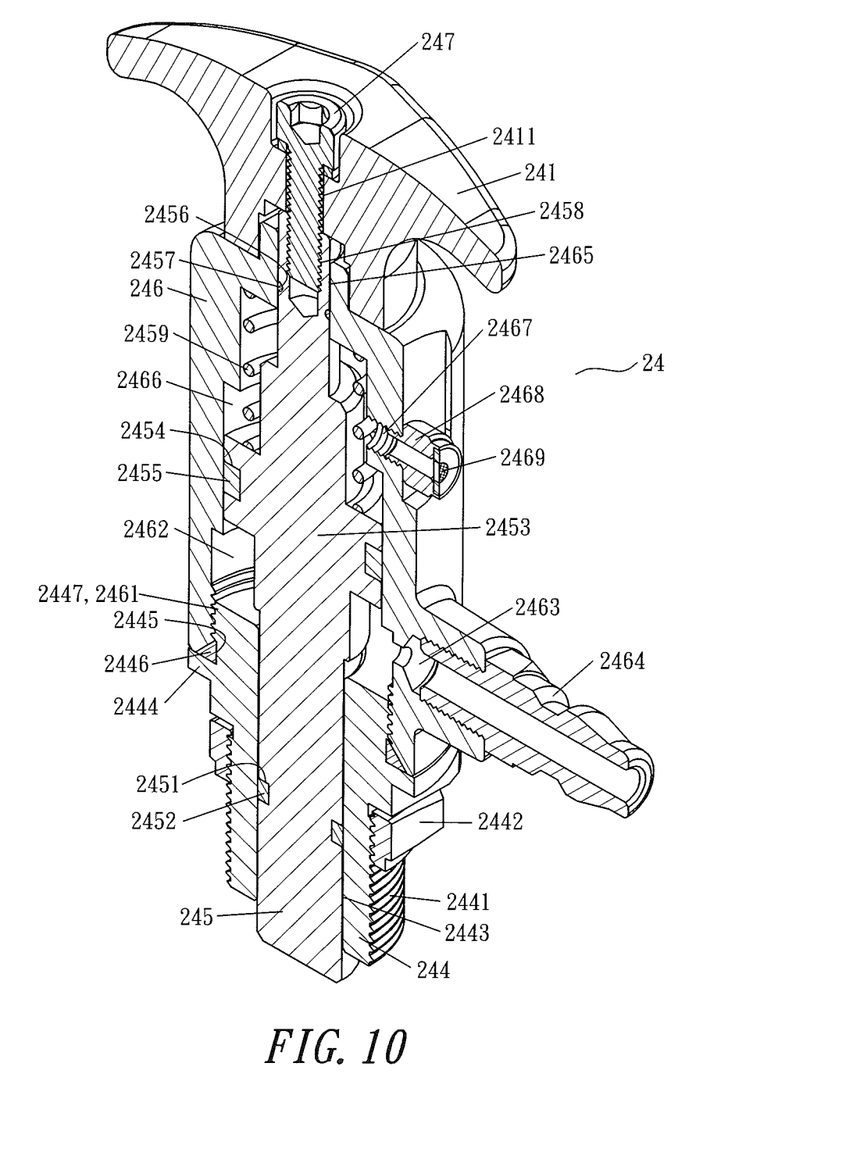
FIG. 10 is a cross-sectional perspective view of a preferred embodiment of the present invention.

With reference to FIGS. 8~10 for a power winch in accordance with a preferred embodiment of the present invention, a clutch 24 is installed to a power winch 20, and the assembly is similar to the aforementioned conventional power winch 10. The power winch 20 comprises a deceleration device 22, an inner ring gear 242 sheathed on an inner side of a gearbox 221 of the deceleration device 22 and linked to the deceleration device 22, a plurality of braking grooves 243 formed on a surface of an outer ring of the inner ring gear 242, a through slot 222 formed at the top of the gearbox 221 and configured to be corresponsive to the braking groove 243, and an internal thread 2221 formed on an inner side of the through slot 222.

The clutch 24 comprises the following components:

A lower seat 244 with an external thread 2441 is formed on an outer wall of the bottom section of the lower seat 244, and the lower seat 244 is screwed from the top to the bottom of the external thread 2441 into the through slot 222 of the gearbox 221 to achieve a secured connection. Then a positioning nut 2442 is screwed downwardly along the external thread 2441 to abut the top side of the gearbox 221, to connect the lower seat 244 to the through slot 222 more closely. The lower seat 244 has a penetrating slot 2443 formed longitudinally therein, a positioning wall 2444 extended from an upper section of the lower seat 244, a ring groove 2445 formed at the top of the lower seat 244 for installing an O-ring 2446, and an external thread 2447 formed on an outer wall of the top end of the lower seat 244.

A clutch lever 245 is inserted from top to bottom into the penetrating slot 2443 of the lower seat 244, and the bottom end of the clutch lever 245 may be controlled to extend out from the bottom of the penetrating slot 2443 and abut one of the braking grooves 243. A ring groove 2451 is formed at a lower section of the clutch lever 245 for installing an O-ring 2452, to achieve a close attachment with the inner wall of the penetrating slot 2443. The clutch lever 245 is extended and broadened upwardly to form a large disc section 2453. A ring groove 2454 is formed around the periphery of the large disc section 2453 for installing an O-ring 2455 and then further upwardly extended and tapered. A micro-channel 2456 is formed on the peripheral wall at the top section for installing an O-ring 2457. Finally, a screw groove 2458 is inwardly and downwardly formed at the top end, and an elastic member 2459 is sheathed on the periphery of the clutch lever 245 from top to bottom. The bottom of the elastic member 2459 abuts the top of the large disc section 2453.

An upper seat 246 has an inwardly hollow bottom and can cover the elastic member 2459, the clutch lever 245 and the top of the lower seat 244. The peripheral wall inside the bottom of the upper seat 246 is an inclined wall. An internal thread 2461 is formed at the top of the upper seat 246 for screwing and coupling with an external thread 2447 at the outer wall of the top of the lower seat 244. Thus, the bottom side of the lower seat 244 abuts the positioning wall 2444 of the lower seat 244. In the meantime, the inclined wall abuts the O-ring 2446 to define a close (airtight) attachment, and the upper seat 246 is tapered when extending upward, so that the upper seat 246 corresponsive to inner wall of the large disc section 2453 of the clutch lever 245 abuts the O-ring 2455 to define a close (airtight) attachment, so that a lower air chamber 2462 is formed between the bottom of the large disc section 2453, the clutch lever 245, and the upper seat 246. An air inlet passage 2463 is formed in the peripheral wall of the upper seat 246 and configured to be corresponsive to the lower air chamber 2462 and extended outward for locking and coupling a pneumatic connector 2464, and the upper seat 246 is tapered when extending upward. A penetrating slot 2465 is inwardly formed at the top for extending out from the top of the clutch lever 245, and the peripheral wall of the penetrating slot 2465 abuts the O-ring 2457 to define a close (airtight) attachment. Now, the top of the elastic member 2459 abuts an inner top wall at the inner curved position of the upper seat 246. In the meantime, an upper air chamber 2466 is formed between the upper seat 246 and the clutch lever 245 and the large disc section 2453. An air passage 2467 is formed on the peripheral wall of the upper seat 246, so that the upper air chamber 2466 is communicated with the outside. A silencer 2468 may be locked and coupled to an outer side of the air passage 2467, and a net 2469 is coupled to the front end of the silencer 2468.

A handle 241 has a through groove 2411 inwardly formed at the top of the handle 241, and the bottom of the handle 241 can cover the upper seat 246. An engaging member 247 is passed from top to bottom through the through groove 2411 and locked and coupled to the screw groove 2458 of the clutch lever 245.

Figure 11:
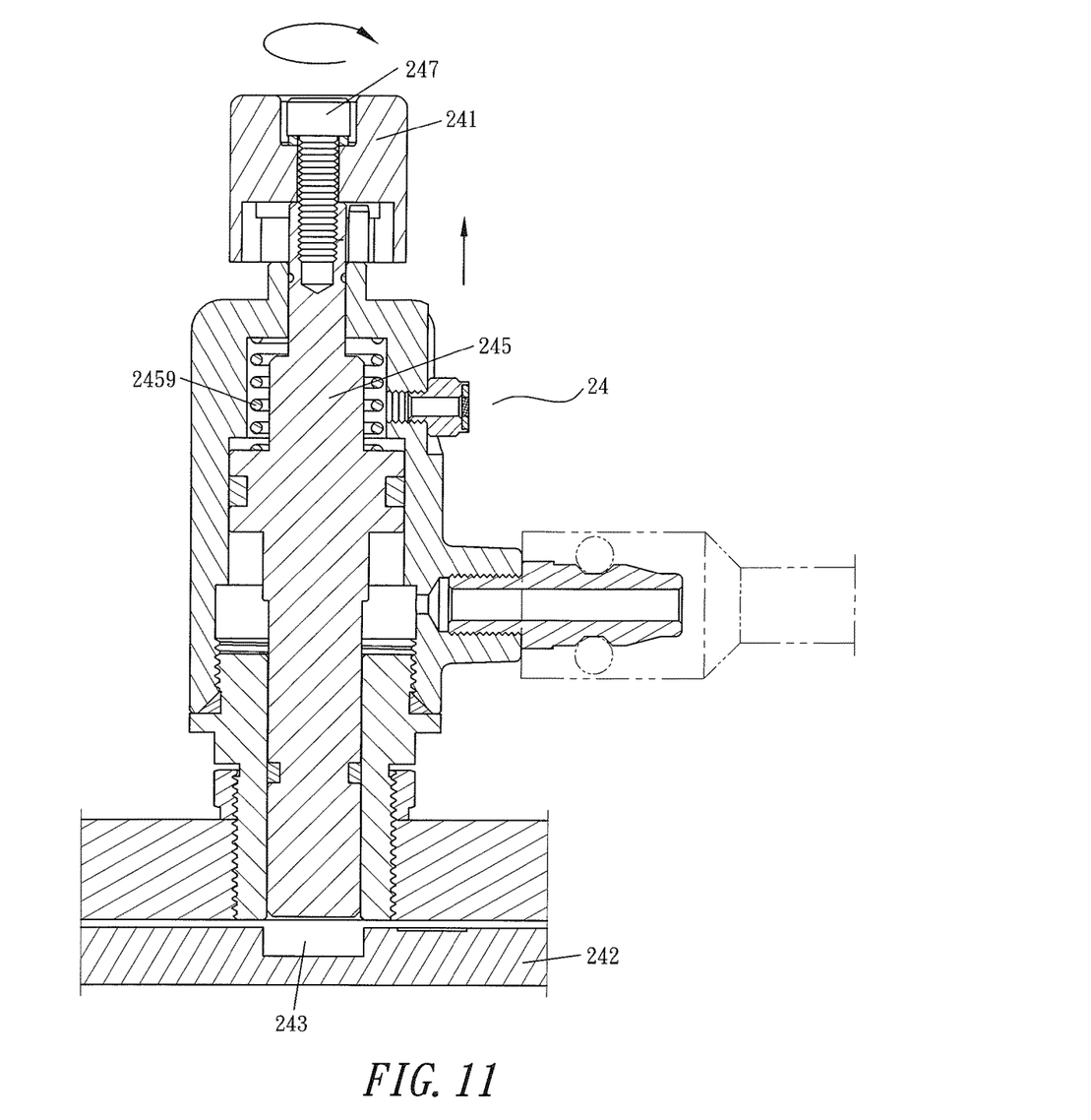
FIG. 11 is a schematic view of controlling a clutch manually in accordance with a preferred embodiment of the present invention.

After the aforementioned assembling process is completed, the clutch provides two options for controlling the use of the clutch 24. In the first option, the clutch 24 may be controlled manually as shown in FIG. 11. When the handle 241 is lifted to a position higher than the top side of the upper seat 246 and rotated to an angle substantially equal to 90°, the clutch lever 245 is driven to compress the elastic member 2459 to rise synchronously, so that the bottom of the clutch lever 245 is released from the latch of the braking groove 243, and so that the inner ring gear 242 can be rotated freely. The operation of the deceleration device 22 can be stopped. Therefore, an operator can pull out the cable easily for hooking, hanging and towing objects. On the other hand, when the handle 241 resumes its descending, the bottom of the clutch lever 245 enters into any one of the braking grooves 243, and the inner ring gear 242 stops its rotation, to resume the status as shown in FIG. 9. Now, the power of the deceleration device 22 reaches the cable pulley 13 again, and the transmission of power retracts the cable to achieve the effect of towing objects by the cable.

Figure 12:
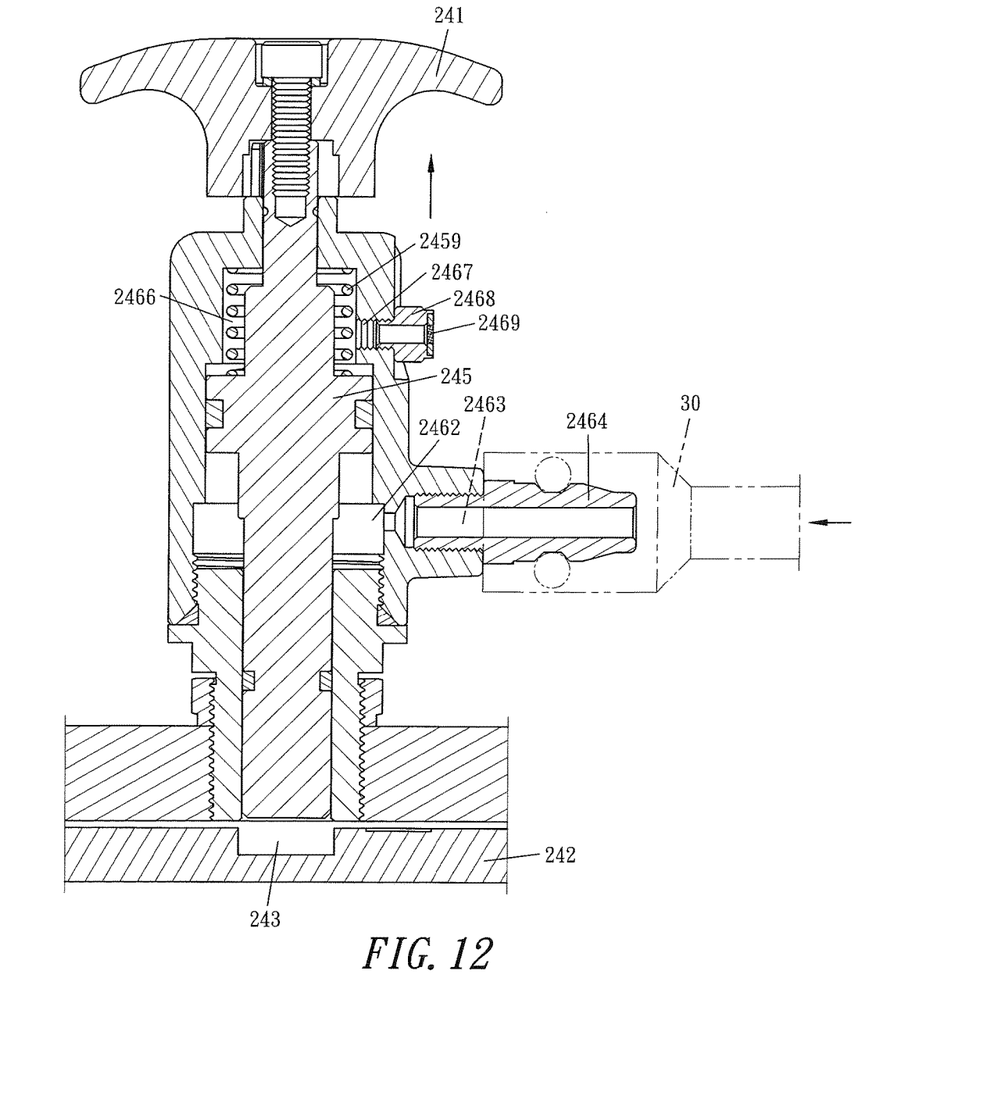
FIG. 12 is a schematic view of controlling a clutch pneumatically in accordance with a preferred embodiment of the present invention.

In the second option, the clutch 24 may be controlled pneumatically as shown in FIG. 12. The pneumatic connector 2464 is sheathed to a pump connector 30, and the pump connector 30 is connected to an air pump (not shown in the figure) through a pipeline. Thus, when the air pump is turned on for pumping air, air pressure is pumped continuously into the lower air chamber 2462 through the pneumatic connector 2464 and the air inlet passage 2463 to drive the clutch lever 245 to rise gradually. Now, the air in the upper air chamber 2466 is compressed to pass from the silencer 2468 to the outside through the net 2469. As the air is pumped into the air inlet passage 2463 continuously, the bottom of the clutch lever 245 will be released from the latch of the braking groove 243, so that the power of the deceleration device 22 transmitted to the inner ring gear 242 is disconnected, and so that the operator can pull out the cable for hooking, hanging and towing objects easily. On the other hand, when the air pump stops the pumping operation, and when the pump connector 30 and the pneumatic connector 2464 are disconnected, the high-pressure air in the lower air chamber 2462 will be leaked from the pneumatic connector 2464 in an opposite direction. In the meantime, the effect of passing air from the silencer 2468 through the net 2469 to the outside enter the air into the upper air chamber 2466 quickly, so that a balance of air pressure between the upper and lower air chambers 2466, 2462 can be achieved. In the process of entering the bottom of the clutch lever 245 into any one of the braking grooves 243 again, the inner ring gear 242 stops its operation, and the status as shown in FIG. 9 will be resumed. Now, the power of the deceleration device 22 reaches the cable pulley 13 again, and the transmission of power retracts the cable to achieve the effect of towing objects by the cable.

In view of the description above, the present invention primarily provides two options for users to control the clutch of the power winch manually or pneumatically. The pneumatic control simply connects the pump connector of the air pump to the pneumatic connector of the clutch for its use. Even if the user stands at a position far from the power winch, the user still can turn the air pump on or off in order to shift the clutch. To turn the air pump on or off, a cable remote controller or a wireless remote controller can be used, so that the operation is very convenient.

While the invention has been described by means of specific embodiments, numerous modifications and variations could be made thereto by those skilled in the art without departing from the scope and spirit of the invention set forth in the claims.

What is claimed is:
1. A power winch comprising:
 a motor with a power for driving a deceleration device through an internal axial transmission; and
 a plurality of planetary gear sets for driving a cable pulley to rotate after the internal axial transmission;
 wherein a cable wound around the cable pulley can be released or retracted, with the deceleration device having a gearbox, an inner ring gear sheathed on an inner side of the gearbox and linked with the deceleration device, with an outer ring surface of the inner ring gear having a plurality of braking grooves, with a top of the gearbox having a through slot corresponsive to the plurality of braking grooves, and a clutch installed on the through slot, with the clutch having a clutch lever, with a bottom of the clutch lever passed through the through slot and configured to be corresponsive to one of the plurality of braking grooves, with the clutch lever being upwardly coupled to a handle, with the handle operated to ascend or descend to link the bottom of the clutch lever to be latched to or released from one of the plurality of braking grooves, to connect or disconnect the internal axial transmission between the deceleration device and the cable pulley, wherein air is pumped into the clutch, wherein the bottom of the clutch lever is lifted pneumatically to release from latching with the one of the plurality of braking grooves, to disconnect the internal axial transmission between the deceleration device and the cable pulley, wherein the clutch has a lower seat and an upper seat, wherein a bottom section of the lower seat is coupled to the through slot of the gearbox, wherein a penetrating slot is formed longitudinally inside the lower seat, wherein a positioning wall is formed and extended from an upper section of the lower seat; wherein the clutch lever is inserted into the penetrating slot of the lower seat, wherein a first ring groove is formed at a lower section of the clutch lever, wherein a first O-ring is provided for enclosing the first ring groove and closely attaching to an inner wall of the penetrating slot, wherein a large disc section is formed after the clutch lever is extended upwardly, wherein a second ring groove is formed around a periphery of the large disc section, wherein a second O-ring is provided for enclosing the second ring groove and is further extended upward, wherein a micro-channel is formed at a peripheral wall at a top section of the clutch lever, wherein a third O-ring is provided for enclosing the micro-channel, wherein a screw groove is inwardly and downwardly formed at the top end of the clutch lever, wherein an elastic member is sheathed on the clutch lever, wherein a bottom end of the elastic member abuts the large disc section; wherein the upper seat is hollowed inwardly, wherein the lower seat is coupled to the positioning wall, wherein when the upper seat is extended upwardly, the upper seat is aligned with the large disc section of the clutch lever, wherein a lower air chamber is formed between the large disc section, the lower seat, the clutch lever and the upper seat, wherein an air inlet passage is formed in a peripheral wall of the upper seat corresponsive to the lower air chamber and extended outside for locking and coupling a pneumatic connector, wherein a penetrating slot is inwardly formed on the upper seat extended upwardly for extending the clutch lever to outside, wherein a top end of the elastic member abuts the upper seat, wherein an upper air chamber is formed between the upper seat and the clutch lever and the large disc section, wherein an air passage is formed on the upper seat, wherein the upper air chamber is communicated to the outside, wherein a silencer is locked and coupled to an outer side of the air passage, wherein a net is coupled to the front end of the silencer; wherein the handle has a through groove inwardly formed at a top of the handle, wherein a bottom covers the upper seat, and wherein an engaging member is passed from top to bottom through the through groove and locked and coupled to the screw groove of the clutch lever.

* * * * *